(12) United States Patent
Kiel et al.

(10) Patent No.: US 10,871,100 B2
(45) Date of Patent: Dec. 22, 2020

(54) METHOD FOR OPERATING A COMBUSTION MACHINE, COMBUSTION MACHINE AND MOTOR VEHICLE

(71) Applicant: Volkswagen Aktiengesellschaft, Wolfsburg (DE)

(72) Inventors: Marco Kiel, Magdeburg (DE); Holger Loof, Sickte (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/156,598

(22) Filed: Oct. 10, 2018

(65) Prior Publication Data

US 2019/0107036 A1    Apr. 11, 2019

(30) Foreign Application Priority Data

Oct. 10, 2017    (DE) .......................... 10 2017 123 466

(51) Int. Cl.
*F01N 3/023*    (2006.01)
*F01P 7/14*    (2006.01)
(Continued)

(52) U.S. Cl.
CPC ............... *F01P 7/14* (2013.01); *F01N 3/023* (2013.01); *F01N 3/043* (2013.01); *F01N 3/2006* (2013.01);
(Continued)

(58) Field of Classification Search
CPC ........ F01N 3/023; F01N 3/043; F01N 3/2006; F01N 9/002; F01N 2250/10;
(Continued)

(56) References Cited

U.S. PATENT DOCUMENTS 4,005,693 A * 2/1977 Masaki ..................... F01P 5/00
123/406.55
7,104,051 B2 * 9/2006 Shimasaki ............ F01N 3/0253
60/274
(Continued)

FOREIGN PATENT DOCUMENTS

CN    101175905 A    5/2008
CN    101932801 A    12/2010
(Continued)

OTHER PUBLICATIONS

Search report for German Patent Application No. 10 2017 123 466.7, dated Jun. 15, 2018.
(Continued)

*Primary Examiner* — Matthew T Largi
(74) *Attorney, Agent, or Firm* — Pearl Cohen Zedek Latzer Baratz LLP (57) ABSTRACT

A thermal overload of an internal combustion engine and of cooling system of a combustion machine due to a raising of the temperature of the exhaust gas flowing through an exhaust gas line of the combustion machine, which is provided as a measure to desulfurize a $NO_x$ storage catalytic converter and/or to regenerate a particulate filter, is prevented in that before and/or during this measure, the cooling output for the coolant flowing through the cooling system is systematically increased in order to achieve a lowering of the coolant temperature to a value range that lies below what would normally—that is to say, without the simultaneous desulfurization of the $NO_x$ storage catalytic converter and/or without the regeneration of the particulate filter—have been provided for the operation of the combustion machine in a corresponding operating state of the internal combustion engine.

15 Claims, 2 Drawing Sheets

(51) Int. Cl.
*F01N 3/04* (2006.01)
*F02M 26/28* (2016.01)
*F01N 3/20* (2006.01)
*F01N 9/00* (2006.01)
*F01P 3/20* (2006.01)
*F01P 7/16* (2006.01)
*F01N 3/08* (2006.01)
*F01N 3/033* (2006.01)
*F02M 26/05* (2016.01)
*F02M 26/06* (2016.01)

(52) U.S. Cl.
CPC ............... *F01N 9/002* (2013.01); *F01P 3/20* (2013.01); *F02M 26/28* (2016.02); *F01N 3/0234* (2013.01); *F01N 3/033* (2013.01); *F01N 3/0807* (2013.01); *F01N 3/0814* (2013.01); *F01N 3/0842* (2013.01); *F01N 3/0871* (2013.01); *F01N 3/0885* (2013.01); *F01N 2250/10* (2013.01); *F01N 2260/024* (2013.01); *F01N 2900/08* (2013.01); *F01N 2900/1602* (2013.01); *F01P 7/167* (2013.01); *F01P 2060/02* (2013.01); *F02M 26/05* (2016.02); *F02M 26/06* (2016.02)

(58) Field of Classification Search
CPC ........... F01N 2260/024; F01N 2900/08; F01N 2900/1602; F01N 3/0234; F01N 3/033; F01N 3/0807; F01N 3/0814; F01N 3/0842; F01N 3/0871; F01N 3/0885; F01P 3/20; F01P 7/14; F01P 2060/02; F01P 7/167; F02M 26/28; F02M 26/05; F02M 26/06
See application file for complete search history.

(56) References Cited

U.S. PATENT DOCUMENTS

| | | | |
|---|---|---|---|
| 7,110,904 B2* | 9/2006 | Lippa | .................. B60H 1/3208 702/102 |
| 2004/0055283 A1 | 3/2004 | Iihoshi et al. | |
| 2006/0130466 A1 | 6/2006 | Sisken et al. | |
| 2009/0064665 A1 | 3/2009 | Iizuka et al. | |
| 2013/0283769 A1 | 10/2013 | Watanabe et al. | |
| 2016/0061093 A1 | 3/2016 | Johansson et al. | |

FOREIGN PATENT DOCUMENTS

| | | | | |
|---|---|---|---|---|
| CN | 104775878 A | 7/2015 | | |
| CN | 107084082 A | 8/2017 | | |
| DE | 199 48 148 A1 | 6/2001 | | |
| DE | 10 2005 058 020 A1 | 7/2006 | | |
| DE | 10 2005 058020 A1 | 7/2006 | | |
| DE | 10 2008 008 495 A1 | 8/2009 | | |
| DE | 11 2014 001 722 T5 | 12/2015 | | |
| EP | 1 403 480 A2 | 3/2004 | | |
| EP | 1 882 829 A1 | 1/2008 | | |
| EP | 1882829 A1 * | 1/2008 | ............. | F01N 3/023 |
| GB | 2 507 342 B | 4/2014 | | |
| JP | 2009209815 A | 9/2009 | | |
| JP | 2010275956 A | 12/2010 | | |
| WO | WO 2009/078847 A1 | 6/2009 | | |
| WO | WO 2015/147488 A1 | 10/2015 | | |

OTHER PUBLICATIONS

Search report for European Patent Application No. 18197113.6, dated Jan. 10, 2019.
Search report for Chinese Patent Application No. 2018111807046, dated Jul. 3, 2020.

* cited by examiner

METHOD FOR OPERATING A COMBUSTION MACHINE, COMBUSTION MACHINE AND MOTOR VEHICLE

CROSS-REFERENCE TO RELATED APPLICATIONS

This application claims priority from German Patent Application No. 10 2017 123 466.7, filed Oct. 10, 2017, which is hereby incorporated by reference.

FIELD OF THE INVENTION

The invention relates to a method for operating a combustion machine, to a combustion machine that is suitable for carrying out such a method as well as to a motor vehicle having such a combustion machine.

BACKGROUND OF THE INVENTION

As a rule, combustion machines for motor vehicles have a cooling system in which a coolant is pumped through at least one cooling circuit by means of one or more coolant pumps and, in the process, said coolant picks up thermal energy from components that are integrated into the cooling circuit, among other things, an internal combustion engine. Once an operating temperature range of the combustion machine has been reached, this thermal energy is subsequently released into the ambient air in an ambient heat exchanger, the so-called main cooler, as well as at times, in a heating heat exchanger; in the case of the heating heat exchanger, this energy is released into the ambient air provided for the climate control of the interior of the motor vehicle.

A combustion machine for a motor vehicle can also have an exhaust gas recirculation (EGR) system by means of which part of the exhaust gas generated by an internal combustion engine of the combustion machine can be conveyed out of an exhaust gas line of the combustion machine into a fresh gas line of the combustion machine and can then be recirculated to the internal combustion engine through said fresh gas line, as a result of which especially certain pollutant emissions should be kept at low levels during operation of the combustion machine. A known procedure is the use of a so-called high-pressure exhaust gas recirculation system in which the exhaust gas recirculation system branches off from the exhaust gas line upstream from a turbine of an exhaust gas turbocharger that is integrated into the exhaust gas line and opens up into the fresh gas line downstream from a compressor of the exhaust gas turbocharger integrated into the fresh gas line. A likewise known procedure is the use of a so-called low-pressure exhaust gas recirculation system in which the exhaust gas recirculation system branches off from the exhaust gas line downstream from the turbine of an exhaust gas turbocharger and opens up into the fresh gas line upstream from the compressor of the exhaust gas turbocharger. In order to avoid an excessively high temperature of the fresh gas that is fed to the internal combustion engine and that is an air-exhaust gas mixture when the exhaust gas recirculation system is activated, it can be provided for an (EGR) cooler to be integrated into the exhaust gas recirculation line, whereby said cooler, as a heat exchanger, allows thermal energy from the exhaust gas that is to be recirculated to be transferred to a coolant that is likewise flowing through the heat exchanger. Normally, such an EGR cooler is integrated into a cooling system of the combustion machine, said cooling system also comprising cooling channels of the internal combustion engine.

A combustion machine for a motor vehicle can also comprise a $NO_x$ storage catalytic converter and/or a particulate filter which are integrated into the exhaust gas line of the combustion machine and which serve to reduce pollutants in the exhaust gas that is generated during combustion processes in an internal combustion engine of the combustion machine and that is to be discharged into the environment via the exhaust gas line. In concrete terms, nitrogen oxides ($NO_x$) are stored in a $NO_x$ storage catalytic converter during certain operating states of the internal combustion engine when their reduction to nitrogen (N) and oxygen ($O_2$) is not possible, while a particulate filter filters (soot) particles out of the exhaust gas flow. It holds true for $NO_x$ storage catalytic converters as well as for particulate filters that, in order for them to retain their functionality, they have to be regenerated once they have reached a defined load limit. In the case of a $NO_x$ storage catalytic converter, there is the additional aspect that it has to be desulfurized at regular intervals, a procedure that is also referred to as desulfatization. This is necessary because the sulfur normally contained in fuel reacts with the storage material of the $NO_x$ storage catalytic converter, as a result of which the amount of storage material available for the $NO_x$ storage decreases. This gives rise to sulfates (for instance, barium sulfate) which are very temperature-resistant and are not degraded at the exhaust gas temperatures that have to be set for a $NO_x$ regeneration. For desulfurization purposes, the $NO_x$ storage catalytic converter has to be heated up, among other things by targeted measures, to temperatures that usually lie between 600° C. and 650° C. Comparable temperatures are also required to regenerate a particulate filter if a lowering of the oxidation temperature of the soot particles is not achieved through the admixture of an additive.

As a rule, the $NO_x$ storage catalytic converter and/or the particulate filter are heated up to the temperatures needed for desulfurization or for regeneration by appropriately raising the temperature of the exhaust gas, for which purpose various, especially engine-internal, measures are known. One problem that arises during such a desulfurization or regeneration because of the relatively high exhaust gas temperatures is that this process introduces a considerable thermal output into the cooling system of the combustion machine and especially into the internal combustion engine. This is particularly the case if the combustion machine has an exhaust gas recirculation system since the initiation of the above-mentioned raising of the exhaust gas temperature as a measure to desulfurize a $NO_x$ storage catalytic converter and to regenerate a particulate filter is especially necessary if the internal combustion engine is being operated at relatively low loads and rotational speeds. In such operating states, however, a considerable fraction of the exhaust gas is normally recirculated to the fresh gas line, a process in which is it cooled by the EGR cooler(s) integrated into the cooling system.

German patent application DE 199 48 148 A1 discloses a motor vehicle having a combustion machine with a $NO_x$ storage catalytic converter integrated into an exhaust gas line. In order to achieve the best possible operation of the $NO_x$ storage catalytic converter, a section of the exhaust gas line upstream from the $NO_x$ storage catalytic converter is cooled by means of an adjustable air flow during operation of an internal combustion engine of the combustion machine that leads to relatively high exhaust gas temperatures.

British patent specification GB 2507342 B discloses a method for ascertaining the soot load of a particulate filter installed in an exhaust gas line of a combustion machine. In this context, the soot inflow into the particulate filter is ascertained during an instationary operating state in that the soot inflow for an appertaining stationary operating point is determined and then corrected in such a way that a deviation of the soot inflow due to the instationary operating situation is taken into consideration.

SUMMARY OF THE INVENTION

The invention was based on the objective of preventing a thermal overload of the internal combustion engine and/or of the cooling system due to the desulfurization of the $NO_x$ storage catalytic converter and/or due to the regeneration of the particulate filter in a combustion machine comprising an internal combustion engine, a cooling system, optionally an exhaust gas recirculation line with an EGR cooler that is integrated into the cooling system, and an exhaust gas line with an integrated $NO_x$ storage catalytic converter and/or an integrated particulate filter.

This objective is achieved by means of a method for operating a combustion machine according to certain claims. A combustion machine suitable for automatically carrying out such a method as well as a motor vehicle having such a combustion machine are the subject matter of certain claims. Advantageous embodiments of the method according to the invention and preferred configurations of the combustion machine according to the invention and thus also of the motor vehicle according to the invention are the subject matter of the other patent claims and/or ensue from the description of the invention given below.

The invention is based on the notion of preventing a thermal overload of an internal combustion engine and/or of a cooling system of a combustion machine due to a raising of the temperature of the exhaust gas, which is provided as a measure to desulfurize a $NO_x$ storage catalytic converter and/or to regenerate a particulate filter, in that before and/or during this measure, the cooling output for the coolant flowing through the cooling system is purposefully increased in order to achieve a lowering of the coolant temperature to a value range that lies below what would normally—that is to say, without this measure—have been provided for the operation of the combustion machine in a corresponding operating state of the internal combustion engine.

Before this backdrop, according to the invention, a method is being put forward for operating a combustion machine comprising at least an internal combustion engine (especially a diesel engine or a gasoline engine or else a combination thereof, that is to say, for instance, an internal combustion engine with homogenous charge compression ignition), a fresh gas line, an exhaust gas line and a cooling system comprising an ambient heat exchanger as well as a cooling channel of the internal combustion engine, whereby a $NO_x$ storage catalytic converter and/or a particulate filter is integrated into the exhaust gas line and whereby, as a measure to desulfurize the $NO_x$ storage catalytic converter and/or to regenerate the particulate filter, the temperature of the exhaust gas flowing through the exhaust gas line is temporarily set to at least a minimum value required for the (appertaining) measure. In order to prevent a thermal overload of the internal combustion engine and/or of the cooling system (whereby especially local boiling of the coolant should be avoided) due to the introduction of a relatively high thermal output because of the relatively high temperatures of the exhaust gas that are achieved especially through engine-internal measures and that can consequently lead directly to a corresponding heating up of the internal combustion engine, it is also provided that for—and thus (immediately) before and/or during—the measure to desulfurize the $NO_x$ storage catalytic converter and/or to regenerate the particulate filter the temperature of the coolant flowing through the cooling system, and particularly of the coolant flowing through the cooling circuit of the cooling system comprising the internal combustion engine, is lowered.

For this purpose, a combustion machine according to the invention comprises at least an internal combustion engine, a fresh gas line, an exhaust gas line and a cooling system comprising an ambient heat exchanger as well as a cooling channel of the internal combustion engine, whereby a $NO_x$ storage catalytic converter and/or a particulate filter is/are integrated into the exhaust gas line. Moreover, a regulation unit is provided which is configured in such a way that it can carry out a method according to the invention.

The effectuation of a lowering of the coolant temperature can preferably be brought to an end shortly before, directly at the time of, or shortly after, the termination of the measure to desulfurize the $NO_x$ storage catalytic converter and/or to regenerate the particulate filter, so that, for example, the internal combustion engine during normal operation (that is to say, without carrying out the measure to desulfurize the $NO_x$ storage catalytic converter and/or to regenerate the particulate filter) is prevented from having an operating temperature below the operating temperature range that is configured as being optimal for normal operation, due to the lowered temperature of the coolant.

The temperature of the coolant can preferably be measured at a place downstream, preferably directly downstream, from the ambient heat exchanger—which can especially be the main cooler of the cooling system—and/or upstream, preferably directly upstream, from the internal combustion engine, since the temperature of the coolant there is the decisive factor for the temperature ranges that are established for the components that are integrated into the cooling system and that are to be cooled. A combustion machine according to the invention can accordingly have a temperature sensor integrated into the cooling system at such a place. It can also be provided for the temperature sensor to be arranged, or for a measurement of the temperature of the coolant to take place, downstream from or in the outlet of the cooling channel of the internal combustion engine.

The method according to the invention can especially be practically implemented if—during the rise in the temperature of the exhaust gas prescribed as the measure to desulfurize the $NO_x$ storage catalytic converter and/or to regenerate the particulate filter—exhaust gas is conveyed through an exhaust gas recirculation line which comprises an EGR cooler integrated into the cooling system and which branches off from the exhaust gas line and opens up into the fresh gas line, since in this process, a considerable thermal output is introduced into the cooling system via the EGR cooler due to the relatively high temperature of the exhaust gas that is to be recirculated. In this case, it can preferably be provided for the temperature of the coolant that is flowing in a cooling circuit of the cooling system comprising the EGR cooler and preferably also the internal combustion engine to be lowered according to the invention. Accordingly, a combustion machine according to the invention can have an exhaust gas recirculation line that branches off from the exhaust gas line and opens up into the fresh gas line, whereby the exhaust gas recirculation line comprises an EGR cooler integrated into the cooling system. If the combustion machine is configured so as to be charged by means of at least one exhaust gas turbocharger, as is preferably provided for, then the exhaust gas recirculation line can be part of a high-pressure exhaust gas recirculation (HP-EGR) system as well as part of a low-pressure exhaust gas recirculation (LP-EGR) system.

If an exhaust gas recirculation system is provided, it can be practical for the temperature of the coolant flowing in the cooling system to only be lowered according to the invention when the exhaust gas is being conveyed through the exhaust gas recirculation line in a volumetric flow fraction that is above a defined limit value (for instance, at least 50% of the total exhaust gas flow being conveyed through the exhaust gas line), since only then can it be assumed that such a high thermal output will be introduced into the cooling system that this will necessitate or at least render it practical to take appropriate compensating steps. A combustion machine according to the invention can thus have means to ascertain (for example, to measure) the volumetric flow fraction of the exhaust gas being conveyed through the exhaust gas recirculation line.

Preferably, it can also be provided for the extent to which the temperature of the coolant is lowered to be varied as a function of the volumetric flow fraction of the exhaust gas that is being conveyed through the exhaust gas recirculation line. This allows the best possible compensation to be achieved for the increased thermal output that is introduced into the cooling system due to the raised temperature of the exhaust gas resulting from the measure to desulfurize the $NO_x$ storage catalytic converter and/or to regenerate the particulate filter.

The lowering of the temperature of the coolant can preferably be effectuated
 by increasing the fraction of coolant that is being conveyed through the ambient heat exchanger in comparison to the fraction that is being conveyed through a bypass (of the cooling system of the combustion machine according to the invention) that bypasses the ambient heat exchanger, and/or
 by increasing the throughput rate of a fan (of the combustion machine according to the invention) associated with the ambient heat exchanger.
Consequently, the temperature of the coolant can be lowered exclusively by using components of the cooling system which, as a rule, the system already has anyway.

Another way to prevent a local thermal overload, even all the way up to boiling of the coolant, which is fundamentally independent of the other measures described here but which is preferably employed in combination with them, is to maintain a defined pressure level for the coolant during operation of the cooling system since the boiling temperature is pressure-dependent and rises as the pressure increases. In a closed cooling system of the type that is often used nowadays in combustion machines for motor vehicles, the pressure increases starting with a cold start of the combustion machine until the prescribed operating temperature for the coolant is reached, whereby, since a closed compensation tank is provided, the pressure increase is limited but not completely relieved due to the compression of the gas contained therein, as is the case with an open cooling system or a compensation tank. If, for example, the coolant is still at a relatively low temperature shortly after a cold start of the combustion machine, the coolant pressure in the cooling system is also still relatively low. If a high thermal load is then introduced into the coolant, for example, due to a very high load demand being made of the internal combustion engine locally and especially in a cylinder head of the internal combustion engine, then there is a risk of local boiling of the coolant there, as a result of which the latter could be damaged. In order to prevent this, in the state of the cooling system during operation of the combustion machine, it can be provided for a defined pressure level—which has not yet been reached since the temperature of the coolant is still too low—to be actively generated by means of one or more suitable pressure-generating devices. Such a pressure-generating device can be actuated especially as a function of the measurement signal of a pressure sensor that preferably ascertains the gas pressure in a compensation tank of the cooling system. Such an active influencing of the pressure of the coolant can especially be achieved by an appropriate actuation of one or more coolant pumps of the cooling system which can especially be powered by an electric motor or in some other manner independently of the internal combustion engine, optionally in combination with controllable throttles or other flow resistance means. As an alternative or in addition, a pressure-generating device can also be provided that can influence the pressure of the gas that is present in the compensation tank. For this purpose, such a pressure-generating device can comprise a gas-conveying device, especially a compressor, that can introduce additional gas into the compensation tank with the objective of increasing the gas pressure. Such a pressure-generating device can preferably also have an actuatable valve so that the gas pressure in the compensation tank can be systematically reduced once again. As an alternative or in addition, such a pressure-generating device can also have means that can influence the volume and thus the pressure of the gas that is present in the compensation tank. Such means can have, for instance, a wall which at least partially limits the gas volume and which is especially in the form of a membrane that can be moved by means of an actuator in order to change the gas volume.

A motor vehicle according to the invention comprises at least a combustion machine according to the invention that is preferably provided in order to generate a drive output for the motor vehicle. The motor vehicle can especially be a wheel-based motor vehicle (preferably a passenger car or a truck).

The indefinite articles ("a", "an"), especially in the patent claims and in the description that generally explains the patent claims, are to be understood as such and not as numbers. Therefore, components described in a concrete manner should be understood in such a way that they are present at least once and can also be present several times.

BRIEF DESCRIPTION OF THE DRAWINGS

The invention will be explained in greater detail below making reference to an embodiment shown in the drawings. The drawings show the following.

DETAILED DESCRIPTION OF THE INVENTION

Figure 1:
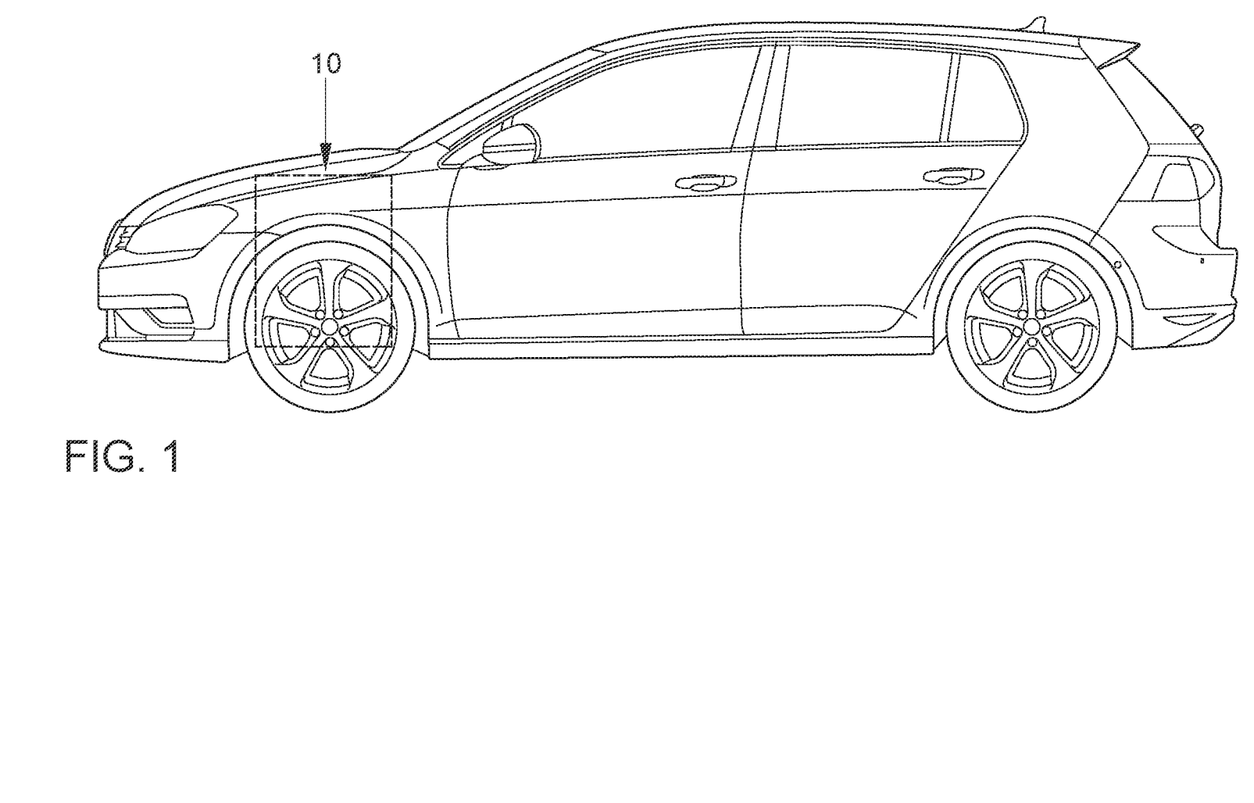
FIG. 1: a motor vehicle according to the invention.

FIG. 1 shows a motor vehicle according to the invention, having a combustion machine 10 according to the invention.

Figure 2:
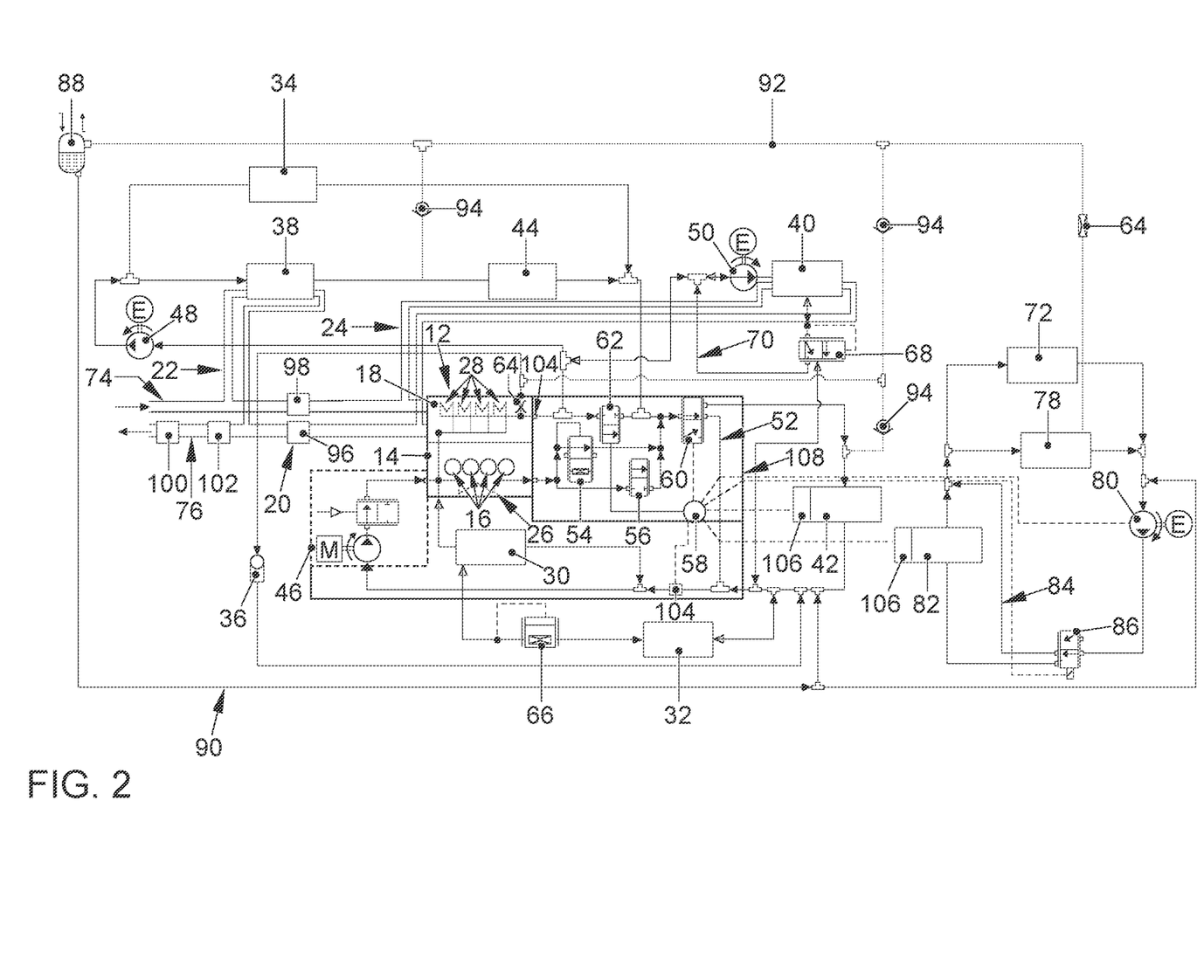
FIG. 2: a combustion machine according to the invention, depicted schematically in a diagram.

Such a combustion machine 10 according to the invention as shown in FIG. 2 can have an internal combustion engine 12 that can especially be configured as a reciprocating-piston internal combustion engine that works in accordance with the Diesel principle and that comprises a cylinder housing 14 with cylinders 16 configured therein as well as a cylinder head 18. Moreover, the combustion machine 10 as shown in FIG. 2 also has a main cooling system and a secondary cooling system.

The main cooling system serves to (directly) cool the internal combustion engine 12, the motor oil that lubricates the internal combustion engine 12, the transmission oil of a (manual or automatic) transmission (not shown here) belonging to the internal combustion engine 12, an exhaust gas turbocharger 20, especially a bearing block or an exhaust gas turbine 96 of the exhaust gas turbocharger 20, as well as exhaust gas that is recirculated either via an exhaust gas recirculation line 22 of a low-pressure exhaust gas recirculation system or via an exhaust gas recirculation line 24 of a high-pressure exhaust gas recirculation system. For this purpose, the main cooling system has cooling channels 26, 28 of the cylinder housing 14 and of the cylinder head 18, a motor oil cooler 30, a transmission oil cooler 32, a cooler for the exhaust gas turbocharger 20, specifically, a cooling channel of the exhaust gas turbine 96 of the exhaust gas turbocharger (ETC cooler) 34, a cooler for (or a cooling channel in) an exhaust gas recirculation valve 36 as well as an EGR cooler in the exhaust gas recirculation line 22 of the low-pressure exhaust gas recirculation system (LP-EGR cooler 38) and another one in the exhaust gas recirculation line 24 of the high-pressure exhaust gas recirculation system (HP-EGR cooler 40). Moreover, the main cooling system comprises a main cooler 42, three coolant pumps 46, 48, 50 as well as a heating heat exchanger 44. The main cooler 42 serves to re-cool this flowing coolant by transferring thermal energy to the ambient air that likewise flows through the main cooler 42. The heating heat exchanger 44, in contrast, serves to warm, and thus control the temperature of, the ambient air, whenever necessary, specifically, the air that is provided to regulate the interior temperature of a motor vehicle comprising the combustion machine 10 (as shown, for example, in FIG. 1). Of the three coolant pumps 46, 48, 50 of the main cooling system, one is provided as the main coolant pump 46 and it can be powered either by an electric motor or, preferably, directly or indirectly by a drive shaft (especially a crankshaft; not shown here) of the internal combustion engine 12, that is to say, it can be powered mechanically. Also if the main coolant pump 46 is mechanically powered, it can be controlled or regulated in terms of its specific throughput rate (that is to say, in each case relating to the drive rotational speed), and it can also be switched off (that is to say, without generating any appreciable throughput in spite of the rotary drive). In this context, it can be provided that, when the main coolant pump 46 is in the switched-off state, the flow of medium through it can be either prevented or permitted. The two other (additional) coolant pumps 48, 50 of the main cooling system, in contrast, are powered by electric motors.

The various heat exchanger components as well as the coolant pumps 46, 48, 50 are integrated into different cooling circuits of the main cooling system. A main cooling circuit comprises the cooling channels 26, 28 of the cylinder head 18 and of the cylinder housing 14, the main cooler 42, a bypass 52 that bypasses the main cooler 42, as well as the main coolant pump 46. The cooling channels 26, 28 of the cylinder head 18 and of the cylinder housing 14 here are integrated into the main cooling circuit in parallel. A first control unit 54 in the form of a (self-regulating) thermostat valve (opening temperature: 105° C.) as well as a second control unit 56 in the form of a control valve that can be actuated by a regulation unit 58 can influence whether and to what extent coolant flows through the cooling channel 26 of the cylinder housing 14 when coolant is flowing through the cooling channel 28 of the cylinder head 18. A third control unit 60, which is likewise configured in the form of a control valve that can be actuated by a regulation unit 58, can influence whether and, if so, to what extent coolant that is flowing, among other things, in the main cooling circuit, is being conveyed through the main cooler 42 or through the bypass 52 associated with it. The first, second and third control units 54, 56, 60 as well as a fourth control unit 62 each constitute part of a coolant distribution module 108.

Moreover, a first secondary cooling circuit is provided, which comprises a secondary segment that branches off directly downstream (relative to a specified direction of flow of the coolant in the main cooling circuit) from an outlet of the cooling channel 28 of the cylinder head 18 from a section of the main cooling circuit and it opens up again upstream from the third control unit 60 into a section of the main cooling circuit. The section of the main cooling circuit between the branch-off and the opening of this secondary segment of the first secondary cooling circuit can be closed by means of the fourth control unit 62, which is configured in the form of a control valve that can be actuated by means of the regulation unit 58, so that, whenever needed, any flow through this section of the main cooling circuit (and consequently the entire main cooling circuit) can be suppressed by means of this fourth control unit 62. A first additional coolant pump 48 of the additional coolant pumps 48, 50 is integrated into the first secondary cooling circuit. Downstream from this first additional coolant pump 48, the first secondary cooling circuit divides into two parallel lines, whereby the LP-EGR cooler 38 and, downstream from there, the heating heat exchanger 44 are integrated into the first of these lines while the ETC cooler 34 is integrated into the second line. The two lines of the secondary segment of the first secondary cooling circuit are reunited once again before they open up into the main cooling circuit.

The main cooling system also comprises a second secondary cooling circuit. A secondary segment of the second secondary cooling circuit into which the cooler (cooling channel) for the exhaust gas recirculation valve 36 is integrated branches off in the vicinity of the outlet of the cooling channel 28 of the cylinder head 18, whereby a throttle 64 that serves to limit the amount of coolant flowing through the second secondary cooling circuit is integrated into this branch-off. The secondary segment of the second secondary cooling circuit opens up upstream from the main coolant pump 46 (as well as downstream from the main cooler 42 and upstream from the opening of the bypass 52 associated with the main cooler 46) into a section of the main cooling circuit.

A third secondary cooling circuit comprises a secondary segment that branches off in the vicinity of the branch-off between the cooling channels 26, 28 of the cylinder head 18 and of the cylinder housing 14 and upstream from the main coolant pump 46 (as well as downstream from the main cooler 42 and the opening of the bypass 52 associated with the main cooler 42) again into a section of the main cooling circuit. The motor oil cooler 30 is integrated into this secondary segment.

A fourth secondary cooling circuit comprises a secondary segment that branches off from the secondary segment of the third cooling circuit and into which a fifth control unit 66 in the form of a thermostat valve (opening temperature: e.g. 75° C.) is integrated as well as the transmission oil cooler 32. The secondary segment of the fourth secondary cooling circuit likewise opens up upstream from the main coolant pump 46 (as well as downstream from the main cooler 42 and upstream from the opening of the bypass 52 associated with the main cooler 42) again into a section of the main cooling circuit.

A fifth secondary cooling circuit of the main cooling system comprises a secondary segment that branches off upstream from the first additional coolant pump 48 out of the secondary segment of the first secondary cooling circuit and into which the second additional coolant pump 50 as well as the HP-EGR cooler 40 are integrated downstream therefrom. A sixth control unit 68 in the form of a thermostat valve (switchover temperature, for instance, between 70° C. and 80° C.) is arranged downstream from the HP-EGR cooler 40. As a function of the temperature, this sixth control unit can distribute coolant that has flowed through the HP-EGR cooler 40 into either an end section of the secondary segment of the EGR cooling circuit or into a short-circuit line 70 that, upstream from the second additional coolant pump 50, opens up into an initial section of the secondary segment of the fifth secondary cooling circuit.

The secondary cooling system serves to cool the fresh gas (charge air) that has been charged by means of a compressor 98 of the turbocharger 20 and that is fed to the internal combustion engine 12 via a fresh gas line 74 of the combustion machine 10 and also serves to cool a metering valve 72 by means of which a reducing agent can be introduced into exhaust gas that is flowing through an exhaust gas line 76 of the combustion machine 10, so that a selective catalytic reduction can reduce the pollutants, especially nitrogen oxides, contained in the exhaust gas. The intercooler 78 provided to cool the charge air on the one hand and the cooling channel provided to cool the metering valve 72 on the other hand are integrated into parallel lines of a cooling circuit of the secondary cooling system. Moreover, a coolant pump 80, which can be powered by an electric motor, as well as an additional cooler 82, which serves to re-cool the coolant flowing through the cooling circuit of the secondary cooling system by transferring thermal energy to the ambient air that is flowing through the additional cooler 82, are integrated into this cooling circuit (in the section that is not divided into two lines). The additional cooler 82 can be bypassed by means of a bypass 84, whereby a seventh control unit 86, which can be configured either as a thermostat valve or as a control valve that can be actuated by means of the control unit, can change the distribution of the coolant flowing through the cooling circuit of the secondary cooling system either into the additional cooler 82 or into the bypass 82 associated with it.

The temperature of the coolant in the main cooling system during regular operation of the combustion machine 10 can be considerably higher in the main cooling system than in the secondary cooling system, at least in certain sections, so that the former can also be referred to as a high-temperature cooling system and the latter as a low-temperature cooling system.

The cooling system also comprises a compensation tank 88 that is partially filled with coolant and partially with air. The compensation tank 88 is fluidically connected to the main cooling circuit of the main cooling system as well as to the cooling circuit of the secondary cooling system by means of a connecting line 90 that starts at a (lower) section of the compensation tank 88 which holds the coolant. Moreover, vent lines 92, which are fitted with one or more non-return valves 94 or a throttle 64, connect the HP-EGR cooler 40, the main cooler 42, the cooling channel 28 of the cylinder head 18 as well as the intercooler 78 to the (upper) section of the compensation tank 88 which holds the air.

The main cooling system of the cooling system as shown in FIG. 1 can be operated, for example, in the following manner.

During a warm-up phase, especially after a cold start of the internal combustion engine, when the coolant in the entire cooling system consequently has a relatively low temperature, it can be provided that the main coolant pump 46 is not operated, as a result of which or whereby it is also switched off and therefore no coolant can flow through it. At the same time, during this warm-up phase, the first additional coolant pump 48 (with a variable throughput rate) can be operated, as a result of which coolant (in conjunction with an interrupting setting of the fourth control unit 62) is conveyed in the first secondary cooling circuit. In this process, the coolant flows through the ETL cooler 34, the LP-EGR cooler 38 and the heating heat exchanger 44 which are all integrated into the secondary segment of the first secondary cooling circuit. Moreover, this coolant flows (completely) through the bypass 52 that likewise constitutes a section of the first secondary cooling circuit to the main water cooler 42 (due to an appropriate setting of the third control unit 60), also through the secondary segment of the third secondary cooling circuit (in a flow direction counter to that during regular operation; see the arrow tip without shading), whereby, optionally through the integration of an appropriate bypass (not shown here) into this secondary segment, coolant can be prevented from flowing through the motor oil cooler 30 as well as through the cooling channel 28 of the cylinder head 18. As a rule, appropriate settings of the first control unit 54 and of the second control unit 56 prevent coolant from also flowing through the cooling channel 26 of the cylinder housing 14, except for a relatively small pilot flow that serves to control the temperature of the first control unit 54, which is configured as a thermostat valve. In exceptional situations, especially in cases of the operation of the internal combustion engine 12 at high loads, particularly at a full load, in spite of the warm-up phase, however, it can also be provided for the second control unit 56 to be changed to a opening setting by means of the regulation unit 58 in order to ensure that the coolant also flows through the cooling channel 26 of the cylinder housing 14. As a function of the temperature of the coolant flowing through the first secondary cooling circuit, the fifth control unit 66 is used during the warm-up phase to prevent coolant from flowing through the secondary segment of the fourth secondary cooling circuit and consequently through the transmission oil cooler 32, at least initially.

Since the coolant flows through the cooling channel 28 of the cylinder head 18, whereby said cooling channel 28 likewise constitutes a section of the first secondary cooling circuit, the coolant also flows through the second secondary cooling circuit into which the cooler (cooling channel) for the exhaust gas recirculation valve 36 is integrated.

During the warm-up phase, it is also provided for the sixth control unit 68 to be set in such a way that, by means of the second additional coolant pump 50, which is operated for this purpose, coolant is conveyed in the short-circuit system which, for the rest, only comprises the HP-EGR cooler 40 and the short-circuit line 70.

During regular operation of the combustion machine 10, the main coolant pump 46 (with a variable specific throughput rate) is operated and coolant is conveyed through all of the cooling circuits of the main cooling system, at least at times. In this process, the two additional coolant pumps 48, 50 of the main cooling system can, if needed, likewise be operated in order to assist the main coolant pump 46. When it comes to the second additional coolant pump 50, however, this only applies after the sixth control unit 68 has been switched over in such a way that coolant is allowed to flow in the fifth cooling circuit. Before this is provided for, the second additional coolant pump 50 is operated in order to convey coolant (also still during regular operation of the combustion machine 10) inside the short-circuit system.

During regular operation of the combustion machine 10, coolant flows continuously through the main cooling circuit, a process in which coolant is always flowing through the cooling channel 28 of the cylinder head 18, in contrast to which the flow of coolant also through the cooling channel 26 of the cylinder housing 14 (provided that the second control unit 56 has not been changed to the opening setting in exceptional situations) is only released by means of the first control unit 54 once the temperature of the coolant in the cooling channel 26 of the cylinder housing 14 has reached a temperature of approximately 105° C.

During regular operation of the combustion machine 10, the third control unit 60 is also used to effectuate a variable distribution of the coolant flowing through the main cooling circuit into either the main cooler 42 or the associated bypass 52, as a result of which a target temperature of approximately 90° C. can be set for the coolant that is leaving the cooling channel 28 of the cylinder head 18.

Moreover, during regular operation of the combustion machine 10, coolant flows continuously through the first secondary cooling circuit into which the ETC cooler 34, the LP-EGR cooler 38 and the heating heat exchanger 44 are integrated. Here, owing to an adapted operation of the first additional coolant pump 48, the volumetric flow of the coolant through the secondary line of the first secondary cooling circuit can also be adapted so as to also be superimposed onto the throughput of the main coolant pump 46. This can be especially relevant in order to achieve a sufficient heat transfer in the heating heat exchanger 44 and thus sufficient heating functionality for heating the interior of a motor vehicle comprising the combustion machine 10.

Coolant also flows continuously through the second secondary cooling circuit into which the cooler (cooling channel) for the exhaust gas recirculation valve 36 is integrated and through the third secondary cooling circuit into which the motor oil cooler 30 is integrated.

When it comes to the fourth secondary cooling circuit into which the transmission oil cooler 32 is integrated, in contrast, this only applies if the temperature of the coolant present at the fifth control unit 66, which is likewise integrated into the secondary segment of the fourth secondary cooling circuit, amounts to at least 75° C., so that the fifth control unit 66 (which can be varied depending on the temperature) then allows the coolant to also flow through the transmission oil cooler 32. Here, too, in the closing setting, a relatively small pilot flow can be provided, serving to control the temperature of the fifth control unit 66, which is configured as a thermostat valve.

Coolant only flows through the fifth secondary cooling circuit as well if the temperature of the coolant previously being conveyed in the short-circuit system has reached at least the applicable limit temperature, which can be between 70° C. and 80° C. Once the sixth control unit 68 has released at least a partial flow of coolant through the fifth cooling circuit 68, the HP-EGR cooler 49 is continuously charged with coolant whose temperature corresponds essentially to the one that had been reached in the outlet of the cooling channel 28 of the cylinder head 18 and that can especially be approximately 90° C.

Regarding the cooling channel 26 of the cylinder housing 14, the secondary segment of the fourth secondary cooling circuit and thus the transmission oil cooler 32 as well as the secondary segment of the EGR cooling circuit, it applies that the appertaining flow of coolant can be interrupted once again by means of the appropriate control units 54, 66, 68 if the value has fallen below the applicable limit temperature or opening temperature.

The flow of coolant through the cooling circuit of the secondary cooling system is effectuated as needed by means of the coolant pump 80 integrated therein and independently of the control or regulation means of the main cooling system.

The cooling system of the combustion machine 10 also allows an after-heating functionality for the internal combustion engine 12 that is no longer being operated, and this is achieved in that coolant is conveyed by means of the first additional coolant pump 48 in the first main cooler 42 that then optionally also comprises the main cooler 42, as a result of which thermal energy that is especially still present in the main cooler 42, in the cylinder head 18 and in the LP-EGR cooler 38 can be utilized in the heating heat exchanger 44 in order to control the temperature of the interior of a motor vehicle comprising the combustion machine 10.

Moreover, the cooling system also allows an after-cooling functionality for the internal combustion engine 12 that is no longer being operated and that was previously under a high thermal load, and this is achieved in that coolant is conveyed by means of the first additional cooling pump 48 in the first secondary cooling circuit that also comprises the main cooler 42, as a result of which the thermally critical components of the cooling system, especially the cylinder head 18 and the exhaust gas turbocharger 20, can be after-cooled by means of the ETC cooler 34 and the LP-EGR cooler 38.

This after-cooling functionality can especially be relevant in conjunction with an automatic stop function of the internal combustion engine 12. Thanks to the automatic stop function, the internal combustion engine 12 is automatically switched off during operation of the combustion machine 10 or of the motor vehicle comprising the combustion machine 10 whenever the engine is not supposed to deliver any drive output. In order to prevent a local thermal overload of the main cooling system and of the components integrated therein, especially the internal combustion engine 12, the LP-EGR cooler 38 and the ETC cooler 34, which can have been subject to high thermal loads to a great extent during the preceding operation of the internal combustion engine 12, while the stop function is activated and consequently while the internal combustion engine 12 is not operating, it is provided for coolant to be conveyed in the first secondary cooling circuit by operating the first additional coolant pump 48. Depending on the settings of the control units 66, 68 and the switching setting that allow coolant to flow through the main coolant pump 46, it is also possible here for coolant to flow through the transmission oil cooler 32, through the motor oil cooler 30, through the main coolant pump 46 as well as through the cooling channels 26 of the cylinder housing 14. At times, the direction of flow (see the directional arrows without shading in FIG. 2) is opposite from the direction of the flow (see the directional arrows with shading in FIG. 2) during operation of the internal combustion engine 12. During the after-cooling, it can be provided for all of the coolant flowing in the first secondary cooling circuit to be conveyed via the main cooler 42. However, the third control unit 60 can also convey a variable fraction (all the way up to the total amount) of this coolant via the bypass 52. In particular, this makes it possible to prevent an excessive cooling of the coolant if the internal combustion engine 12 remains non-operational for a prolonged period of time because the stop function has been activated.

As an alternative or in addition, it is provided for the coolant to also be conveyed in the cooling circuit of the secondary cooling system by means of the coolant pump 80 when the internal combustion engine 12 is not being operated due to an activated stop function, thereby avoiding excessive heating of the intercooler 78. When the internal combustion engine 12 is put back in operation following a manual or automatic deactivation of the automatic stop function, the intercooler 78 can thus once again immediately deliver sufficient output for cooling the charge air that is to be fed to the internal combustion engine 12, so that the charge air is fed to the combustion chambers of the internal combustion engine 12 within the temperature range prescribed for this purpose. The seventh control unit 86 can vary the fraction of coolant flowing in the cooling circuit of the secondary cooling system via the additional cooler 82 or via the associated bypass 84, on the one hand, in order to attain a sufficient cooling output especially for the intercooler 78 and, on the other hand, in order to prevent excessive cooling of the coolant.

Furthermore, it is provided for the combustion machine 10 that, in the case of certain instationary operating states of the internal combustion engine 12, specifically in those cases when the load demand that is made of the operation of the internal combustion engine 12 is increased by at least 20% relative to the full load, the temperature of the coolant flowing in the cooling circuit of the secondary cooling system is lowered, for example, by approximately 20° C. in comparison to that during the preceding stationary operation in order for such an implemented increase in the cooling output of the intercooler 78 to achieve an improved filling of the combustion chambers of the internal combustion engine 12 and consequently an improved build-up of the charge pressure, as a result of which the dynamic operating behavior of the internal combustion engine 12 is improved.

In order to lower the temperature of the coolant flowing in the cooling circuit of the secondary cooling system, to the extent possible, a greater fraction of coolant arriving at the seventh control unit 86 is conveyed via the additional cooler 82. It can also be provided for a fan 106 associated with the additional cooler 82 to be put into operation or for its drive output to be increased, as a result of which the cooling output of the additional cooler 82 can be increased.

A $NO_x$ storage catalytic converter 100 as well as a particulate filter 102 are also integrated into the exhaust gas line 76 of the combustion machine 10. The $NO_x$ storage catalytic converter 100 serves to store nitrogen oxides contained in the exhaust gas when these cannot be reduced to a sufficient extent by the reducing agent that is supplied in combination with a reduction catalytic converter or SCR catalytic converter (not shown here). This can be the case, for instance, after a cold start of the combustion machine 10 or in the case of a relatively prolonged operation of the internal combustion engine 12 at low loads and rotational speeds, as a result of which the SCR catalytic converter does not yet have or no longer has an operating temperature required for a sufficient reduction. The particulate filter 102, in contrast, serves to filter particles out of the exhaust gas.

For the $NO_x$ storage catalytic converter 100 as well as for the particulate filter 102, it applies that, once they have reached a defined load limit, they have to be regenerated in order to retain their functionality. In the case of the $NO_x$ storage catalytic converter 100, there is the additional aspect that it has to be desulfurized at regular intervals since the sulfur normally present in fuel reacts with the storage material of the $NO_x$ storage catalytic converter 100, as a result of which the amount of storage material available for storing the nitrogen oxides diminishes. For purposes of the desulfurization, the $NO_x$ storage catalytic converter 100 has to be heated up, among other things by systematic measures, to a temperature that lies between 600° C. and 650° C. Comparable temperatures are also needed to regenerate the particulate filter 102.

The $NO_x$ storage catalytic converter 100 and the particulate filter 102 are heated up to the temperatures needed for a desulfurization or regeneration by appropriately raising the temperature of the exhaust gas, for which purpose various fundamentally known, especially engine-internal, measures are provided.

While the temperature of the exhaust gas is being raised accordingly in order to bring about the desulfurization of the $NO_x$ storage catalytic converter 100 and the regeneration of the particulate filter 102, a thermal output which has been increased to the commensurate extent is introduced into the internal combustion engine 12 (especially directly on the basis of the engine-internal measures that bring about the rise in the temperature of the exhaust gas) as well as into the entire main cooling system or at least into one or more sections thereof, namely, via the internal combustion engine 12 on the one hand and via the two EGR coolers 38, 40 on the other hand.

In order to prevent a local overload of the cooling system, especially in the area of the internal combustion engine 12 (in this context, it is particularly important to prevent the coolant from boiling), it is provided for the temperature of the coolant—specifically of the coolant that is to be subsequently conveyed via the main cooling pump 46 into the internal combustion engine 12—to be lowered shortly before as well as at least at times during the rise in the temperature of the exhaust gas prescribed for the desulfurization of the $NO_x$ storage catalytic converter 100 and/or for the regeneration of the particulate filter 102, in order to compensate for the increased thermal load of the internal combustion engine 12 as well as of the main cooling system due to the rise in the temperature of the exhaust gas. In this process, the temperature of the coolant is measured by means of a temperature sensor 104 that is integrated into the outlet of the cooling channel 28 of the cylinder head 18.

In order to lower the temperature of the coolant flowing into the internal combustion engine 12, to the extent possible, a greater fraction of coolant arriving at the third control unit 60 is conveyed via the main cooler 42. It can also be provided for a fan 106 associated with the main cooler 42 to be put into operation or for its drive output to be increased, as a result of which the cooling output of the main cooler 42 can be increased.

Shortly before, at the same time as, or shortly after, the raising of the temperature of the exhaust gas prescribed as the measure for the desulfurization of the $NO_x$ storage catalytic converter 100 and/or for the regeneration of the particulate filter 102 has been ended, the lowering of the temperature of the coolant is also ended or reversed in order to prevent the coolant from excessively cooling the components that are integrated into the main cooling system.

LIST OF REFERENCE NUMERALS

10 combustion machine
12 internal combustion engine
14 cylinder housing
16 cylinder
18 cylinder head 20 exhaust gas turbocharger
22 exhaust gas recirculation line of the low-pressure exhaust gas recirculation system
24 exhaust gas recirculation line of the high-pressure exhaust gas recirculation system
26 cooling channel of the cylinder housing
28 cooling channel of the cylinder head
30 motor oil cooler
32 transmission oil cooler
34 ETC cooler
36 exhaust gas recirculation valve
38 LP-EGR cooler
40 HP-EGR cooler
42 ambient heat exchanger/main cooler
44 heating heat exchanger
46 main coolant pump
48 first additional coolant pump
50 second additional coolant pump
52 bypass to the main cooler
54 first control unit
56 second control unit
58 regulation unit
60 third control unit
62 fourth control unit
64 throttle
66 fifth control unit
68 sixth control unit
70 short-circuit line
72 metering valve
74 fresh gas line
76 exhaust gas line
78 intercooler
80 coolant pump of the secondary cooling system
82 ambient heat exchanger/additional cooler
84 bypass to the additional cooler
86 seventh control unit
88 compensation tank
90 connecting line
92 vent line
94 non-return valve
96 exhaust gas turbine of the exhaust gas turbocharger
98 compressor of the exhaust gas turbocharger
100 $NO_x$ storage catalytic converter
102 particulate filter
104 temperature sensor
106 fan
108 coolant distribution module

The invention claimed is:

1. A method of operating a combustion machine comprising an internal combustion engine, a fresh gas line, an exhaust gas line and a cooling system comprising an ambient heat exchanger as well as a cooling channel of the internal combustion engine, whereby a $NO_x$ storage catalytic converter and/or a particulate filter is integrated into the exhaust gas line, comprising:
as a measure to desulfurize the $NO_x$ storage catalytic converter and/or to regenerate the particulate filter, temporarily setting a temperature of the exhaust gas flowing through the exhaust gas line to at least a minimum value required for the measure,
lowering a temperature of a coolant flowing through the cooling system before and/or during the measure to desulfurize the $NO_x$ storage catalytic converter and/or to regenerate the particulate filter,
wherein, during the measure to desulfurize the $NO_x$ storage catalytic converter and/or to regenerate the particulate filter, a portion of the exhaust gas flowing through the exhaust gas line is conveyed through an exhaust gas recirculation line which comprises an EGR cooler integrated into the cooling system,
wherein the temperature of the coolant is lowered only when the portion of the exhaust gas that is being conveyed through the exhaust gas recirculation line is in a volumetric flow fraction that is above a defined limit value, wherein the defined limit value is larger than zero.

2. The method according to claim 1, wherein the lowering of the coolant temperature is brought to an end before, directly at the time of, or shortly after, the termination of the measure to desulfurize the $NO_x$ storage catalytic converter and/or to regenerate the particulate filter.

3. The method according to claim 1, wherein the lowering of the temperature of the coolant is effectuated
by increasing the fraction of coolant that is being conveyed through the ambient heat exchanger in comparison to the fraction that is being conveyed through a bypass that bypasses the ambient heat exchanger, and/or;
by increasing the throughput rate of a fan associated with the ambient heat exchanger.

4. A combustion machine comprising:
an internal combustion engine,
a fresh gas line,
an exhaust gas line, and
a cooling system, the cooling system comprising
an ambient heat exchanger, and
a cooling channel of the internal combustion engine,
wherein a NO storage catalytic converter and/or a particulate filter is integrated into the exhaust gas line, and
a regulation unit configured in such a way that it can carry out the method according to claim 1.

5. The combustion machine according to claim 4, further comprising an exhaust gas recirculation line which comprises an EGR cooler integrated into the cooling system.

6. A motor vehicle having the combustion machine according to claim 4.

7. The method according to claim 1, wherein the defined limit value of the volumetric flow fraction is at least 50% of the exhaust gas flowing through the exhaust gas line.

8. A method of operating a combustion machine comprising an internal combustion engine, a fresh gas line, an exhaust gas line and a cooling system comprising an ambient heat exchanger as well as a cooling channel of the internal combustion engine, whereby a NO storage catalytic converter and/or a particulate filter is integrated into the exhaust gas line, comprising:
as a measure to desulfurize the $NO_x$ storage catalytic converter and/or to regenerate the particulate filter, temporarily setting a temperature of the exhaust gas flowing through the exhaust gas line to at least a minimum value required for the measure,
lowering a temperature of a coolant flowing through the cooling system before and/or during the measure to desulfurize the $NO_x$ storage catalytic converter and/or to regenerate the particulate filter,
wherein, during the measure to desulfurize the $NO_x$ storage catalytic converter and/or to regenerate the particulate filter, a portion of the exhaust gas flowing through the exhaust gas line is conveyed through an exhaust gas recirculation line which comprises an EGR cooler integrated into the cooling system,
wherein an extent to which the temperature of the coolant is lowered is varied as a function of a volumetric flow fraction of the exhaust gas that is being conveyed through the exhaust gas recirculation line.

9. The method according to claim 8, wherein the lowering of the coolant temperature is brought to an end before, directly at the time of, or shortly after, the termination of the measure to desulfurize the $NO_x$ storage catalytic converter and/or to regenerate the particulate filter.

10. The method according to claim 8, wherein the lowering of the temperature of the coolant is effectuated
- by increasing the fraction of coolant that is being conveyed through the ambient heat exchanger in comparison to the fraction that is being conveyed through a bypass that bypasses the ambient heat exchanger, and/or;
- by increasing the throughput rate of a fan associated with the ambient heat exchanger.

11. A combustion machine comprising:
an internal combustion engine,
a fresh gas line,
an exhaust gas line, and
a cooling system, the cooling system comprising
  an ambient heat exchanger, and
  a cooling channel of the internal combustion engine,
wherein a $NO_x$ storage catalytic converter and/or a particulate filter is integrated into the exhaust gas line, and
a regulation unit configured in such a way that it can carry out the method according to claim 8.

12. The combustion machine according to claim 11, further comprising an exhaust gas recirculation line which comprises an EGR cooler integrated into the cooling system.

13. A motor vehicle having the combustion machine according to claim 11.

14. A method of operating a combustion machine comprising an internal combustion engine, a fresh gas line, an exhaust gas line and a cooling system comprising an ambient heat exchanger as well as a cooling channel of the internal combustion engine, whereby a $NO_x$ storage catalytic converter and/or a particulate filter is integrated into the exhaust gas line, comprising:
- as a measure to desulfurize the $NO_x$ storage catalytic converter and/or to regenerate the particulate filter, temporarily setting a temperature of the exhaust gas flowing through the exhaust gas line to at least a minimum value required for the measure,
- lowering a temperature of a coolant flowing through the cooling system before and/or during the measure to desulfurize the $NO_x$ storage catalytic converter and/or to regenerate the particulate filter,
- wherein, for a given operating state of the internal combustion engine, a temperature value range of the coolant during the measure to desulfurize the $NO_x$ storage catalytic converter and/or to regenerate the particulate filter is lower than a temperature value range of the coolant not during the measure to desulfurize the NOx storage catalytic converter and/or to regenerate the particulate filter.

15. The method of operating a combustion machine according to claim 14, wherein the lowering of the temperature of the coolant is achieved by increasing a cooling output for the coolant flowing through the cooling system.

* * * * *